Figure 1:
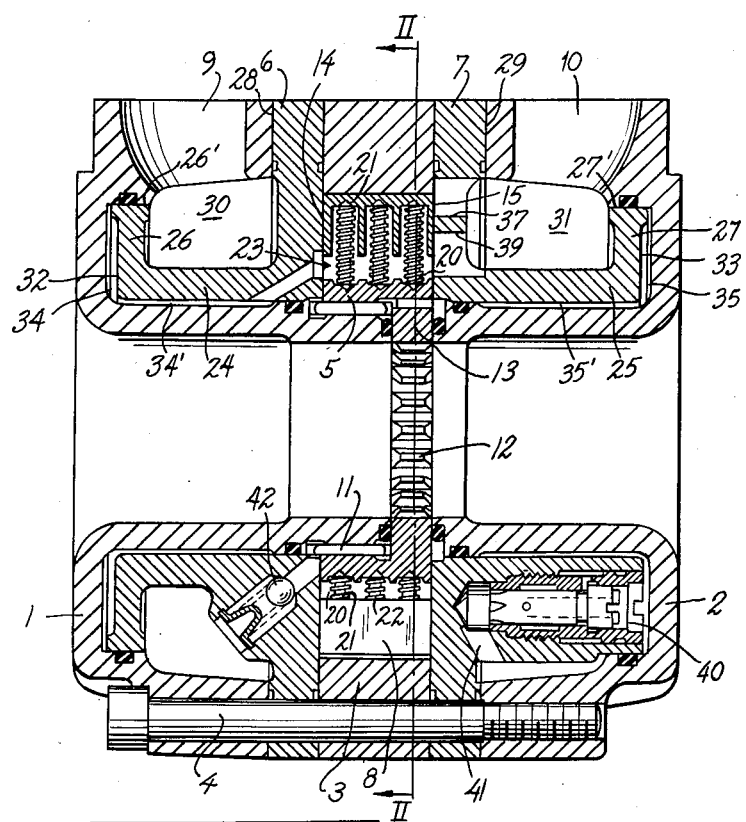

May 1, 1962

H. ERDMANN 3,031,975

ROTARY HYDROSTATIC MACHINE

Filed Sept. 29, 1959

INVENTOR.
HANS ERDMANN

BY *Mestern & Kollin,*

ATTORNEYS

United States Patent Office 3,031,975
Patented May 1, 1962

3,031,975
ROTARY HYDROSTATIC MACHINE
Hans Erdmann, Frankfurt am Main, Germany, assignor to Alfred Teves, Maschinen- und Armaturenfabrik KG., Frankfurt am Main, Germany
Filed Sept. 29, 1959, Ser. No. 843,227
Claims priority, application Germany May 14, 1959
2 Claims. (Cl. 103—136)

The invention relates to a rotary hydrostatic machine of the vane type, wherein the rotor is in contact on both sides with valve disks arranged in the housing.

In known machines of the type the rotor is mounted on a shaft in the housing, and it is usual to take up axial and radial loads by means of bearings arranged on the two sides of the rotor body. Another known practice is to accommodate all bearings on one side of the rotor, or else to mount the rotor and the stator one within the other, the bearing surfaces being non-eccentric circular arcs on the cam contour. Although the rotor is then able to adjust itself by the steering disks axially delimiting its compartments, the radial bearing will tend to dip, since in practice the plane surfaces must always be expected to wobble slightly in relation to the radial bearing. Also, a friction bearing is not suitable for low-speed machines, since formation of a cushioning film between the sliding surfaces requires a certain minimum speed.

The sliding reception of the rotor in the cam contour of the stator imposes close tolerances on the bearing diameter of both parts, and when the cam contour has been worn by the vanes, the bearing will fail to function properly. Besides, the bearing cam surface is exposed to a large dirt hazard since, in view of the volume of oil coming into contact with the bearing surface, the probability of entry of foreign matter from the system is high.

Nevertheless, it remains desirable that the plane in which the rotor exerts its radial forces should coincide as nearly as possible with the middle plane of the bearing. The power input or output of the machine should likewise be located within this plane or in its near vicinity.

With this object, the invention proposes, in a rotary hydrostatic machine consisting of a left-hand housing portion and a right-hand housing portion, both provided with openings for the admission and release of pressure medium and with bell-shaped center openings, with a rotor, a cam ring and radially displaceable vanes dividing the working chamber of the machine into compartments, and with steering disks arranged in the housing to support the rotor axially on both sides and to take up the axial thrust in the housing, that an axially self aligning roller bearing for the rotor, which is supported on the bell of one housing portion, be installed within the space confined by the faces of the rotor. It is further proposed that the mechanical input or output transmission of the machine be effected by means of a hub provided with internal gear teeth or the like, integral with the rotor and arranged within the space confined by its faces.

The device according to the invention will now be more fully described with reference to the accompanying drawing, but it should be understood that this is given by way of illustration and not of limitation and that many changes in the details may be made without departing from the spirit of the invention.

Figure 2:
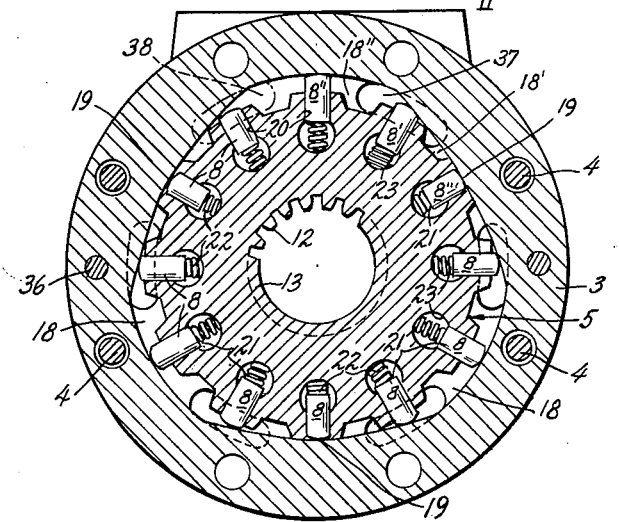

In the drawings:
FIG. 1 is an axial section of the machine and
FIG. 2 is a cross section taken on line II—II of FIG. 1.
FIG. 1 shows an axial section of an embodiment of a machine with bearing and transmission means on the principles of the invention. Two housing portions 1, 2 are assembled with cam ring 3 by means of screws 4 to form a housing in which valve disks 6, 7 are included to support and retain a rotor 5. Vanes 8 move radially in recesses of the rotor. The housing of the machine, which may function as a motor or as a pump, is provided with apertures 9, 10, which, according to the direction of rotation, can serve as inlet or outlet connections. Bearing 11—in this case a cambered needle bearing—is accommodated substantially within the space confined by the faces 14, 15 of the rotor. Part of this space is occupied by the hub 13 of the rotor, having internal gear teeth 12.

The cam ring 3 together with rotor 5, in known manner, forms a plurality of chambers 18, with as many intervening bosses 19 slidingly engaged by the rotor. Radial slots 20 accommodate the sliding vanes 8 which form the bosses 19 between the compartments 18. The inner ends 21 of the vanes are acted upon by compression springs 22 set in chambers 23 which pass axially through the body of the rotor 5. The cam ring 3 and the rotor 5 are sandwiched between the valve disks 6, 7 each having axially projecting from its inner periphery a tubular neck 24, 25 terminated by a flange 26, 27 again paralleling the valve disk. The outside 28, 29 of the valve disk remote from rotor 5, and the peripheries 26', 27' of flanges 26, 27 are in close contact with the housing portions 1, 2. Inside the tubular neck 24, 25, the housing portions 1, 2 also make contact. Between housing portions 1, 2 and valve disks 6, 7 with their cylindrical projections 24, 25 and flanges 26, 27 annular chambers 30, 31 are thus formed alongside the compartments 18, for admission and discharge of pressure fluid. Between housing portions 1, 2 and the outside faces 32, 33 of the flanges as well as the inside faces of the cylindrical projections 24, 25, narrow spaces 34, 34', 35, 35' are provided to receive pressure fluid.

Valve plates 14, 15 are identical, and held in position relative to cam ring 3 by a locating pin 28. They are provided with kidney-shaped ports 37, 38 registering with the chambers 18. Passages 39 establish communication from the annular spaces 30, 31 to the axial chambers 23 traversing the body of the rotor. Openings in the steering disks 32 communicate on one side with the axial chambers 23 through the body of the rotor and on the other side, via passages 39, with the narrow spaces 34, 34', 35, 35' in housing portions 1 and 2.

Each valve plate contains a pressure-reducing valve 60 connected on its high-pressure side via a passage 41 with the annular spcae 30, 31 and on its low-pressure side with the narrow spaces 34, 34', 35, 35'. Oil leakage can return into annular space 30, 31 through a check valve 42.

In the following it is supposed that the machine is functioning as a hydraulic motor.

Fluid flows from inlet 10 to outlet 9, turning the machine in the direction of the arrow in FIG. 2. It enters through port 37 into compartments 18' and 18", and through passage 39 beneath the underside of vane 8', acting upon the surfaces of vanes 8" and 8"' adjoining port 37, as well as upon both surfaces of vane 8'. Similarly it passes through the other intake ports 37 into the corresponding compartments. The rotor is set in motion and transmits the force of the fluid to the hub 12 of the machine. The fluid is discharged, after doing its work, through the ports 38 whose position has been indicated in dot-dash lines in FIG. 2 of the opposite valve disk into annular chamber 30 and thence to the outlet 9.

The working pressure is communicated via passage 41 to pressure-reducing valve 40, which reduces it to a fraction of its value, for transmission into the narrow space 35, 35' and, through passage 43, into the narrow space 34, 34'. The same reduced pressure acts on the outer faces 32, 33 of flanges 26, 27 to prevent any displacement of the valve disks relative to the cam ring and the rotor since the flange area subject to the reduced pressure is made sufficiently large to balance the internal pressure prevailing in the compartments 8. Pin 36 serves to position the cam ring 3 and the disks 6 and 7.

The machine is fixedly mounted on a base, for example by the line connections at apertures 9, 10, or otherwise. The hub 13 receives the driving or driven shaft of the mechanism that is to operate in conjunction with the rotary hydrostatic machine. The connection of the hub to the shaft must by no means have the effect of positively aligning the machine with the said mechanism. Observance of this rule will avoid overdetermination of the bearing. The roller bearing, which must be oversize for reasons of construction, can take additional outside loads, and hence eliminates the need of special bearings for receiving the driving or driven shaft.

The intention is to employ a roller bearing capable of adjustment in its radial plane, for example a conical bearing, or a single-row lateral-thrust ball bearing, or roller or needle bearings having cambered rolling members or cambered races.

What I claim is:

1. In a hydraulic machine, in combination, an annular rotor axially subdivided into a first rotor portion of greater inner wall diameter and a second rotor portion of smaller inner wall diameter; a cam ring coaxially surrounding said rotor; means between said rotor and said cam ring forming chambers of variable volume; a pair of valve disks flanking said rotor and said cam ring while forming lateral boundaries for said chambers, said disks being provided with ports communicating with said chambers for respectively admitting a fluid to said chambers and removing said fluid therefrom; said disks further having central apertures of a diameter substantially equal to said greater inner wall diameter of said first rotor portion and tubular projections internally flush with said apertures extending axially outwardly on opposite sides of said rotor; a housing with cylindrical sleeves coaxially extending within said tubular projections in contact with the latter and with said second rotor portion, one of said sleeves passing with all-around annular clearance within said first rotor portion, said sleeves having internal diameters substantially equal to said smaller inner wall diameter of said second rotor portion in the immediate vicinity thereof and larger internal diameters at their extremities remote from said second rotor portion, said extremities being flared outwardly; bearing means in said clearance supporting said first rotor portion on said one of said sleeves; and a set of internal gear teeth on said second rotor portion engageable with a mating shaft introduced through one of said flared extremities.

2. In a hydraulic machine, in combination, an annular rotor axially subdivided into a first rotor portion of greater inner wall diameter and a second rotor portion of smaller inner wall diameter; a cam ring coaxially surrounding said rotor; a set of radially displaceable pistons angularly spaced along the outer periphery of said rotor and provided with spring means urging them into contact with said cam ring, said pistons defining a plurality of chambers of variable volume between said rotor and said cam ring; a pair of valve disks flanking said rotor and said cam ring while forming lateral boundaries for said chambers, said disks being provided with ports communicating with said chambers for respectively admitting a fluid to said chambers and removing said fluid therefrom; said disks further having central apertures of a diameter substantially equal to said greater inner wall diameter of said first rotor portion and tubular projections internally flush with said apertures extending axially outwardly on opposite sides of said rotor; a housing with cylindrical sleeves coaxially extending within said tubular projections in contact with the latter and with said second rotor portion, one of said sleeves passing with all-around annular clearance within said first rotor portion, said sleeves having internal diameters substantially equal to said smaller inner wall diameter of said second rotor portion in the immediate vicinity thereof and larger internal diameters at their extremities remote from said second rotor portion, said extremities being flared outwardly; bearing means in said clearance supporting said first rotor portion on said one of said sleeves; and a set of internal gear teeth on said second rotor portion engageable with a mating shaft introduced through one of said flared extremities.

References Cited in the file of this patent

UNITED STATES PATENTS

| | | |
|---|---|---|
| 1,591,310 | Hatcher | July 6, 1926 |
| 2,541,405 | Chapman | Feb. 13, 1951 |
| 2,619,912 | Shames | Dec. 2, 1952 |
| 2,649,737 | Hoen et al. | Aug. 25, 1953 |
| 2,653,551 | Rosaen | Sept. 29, 1953 |
| 2,731,919 | Prendergast | Jan. 24, 1956 |
| 2,735,529 | Austin | Feb. 21, 1956 |
| 2,737,341 | Bitzer | Mar. 6, 1956 |
| 2,738,774 | Rosaen | Mar. 20, 1956 |
| 2,868,442 | Nilsson | Jan. 13, 1959 |
| 2,984,186 | Livermore et al. | May 16, 1961 |